(12) United States Patent
Ions et al.

(10) Patent No.: US 7,201,868 B2
(45) Date of Patent: Apr. 10, 2007

(54) DIRECT SMELTING PLANT

(75) Inventors: Philip James Ions, Shelley (AU);
Rodney James Dry, City Beach (AU)

(73) Assignee: Technological Resources Pty. Limited,
Melbourne, VIC (AU)

( * ) Notice: Subject to any disclaimer, the term of this patent is extended or adjusted under 35 U.S.C. 154(b) by 0 days.

(21) Appl. No.: 10/821,952

(22) Filed: Apr. 12, 2004

(65) Prior Publication Data

US 2004/0262823 A1   Dec. 30, 2004

(30) Foreign Application Priority Data

Apr. 10, 2003  (AU) ............................... 2003901692

(51) Int. Cl.
*C21B 13/06* (2006.01)
*C21B 3/04* (2006.01)
*C21C 5/42* (2006.01)

(52) U.S. Cl. .................. 266/142; 266/144; 266/216; 266/236

(58) Field of Classification Search ............... 266/142, 266/144, 166, 195, 216, 227, 236
See application file for complete search history.

(56) References Cited

U.S. PATENT DOCUMENTS 6,399,016 B2 * 6/2002 Burrow ................... 266/142
2004/0256773 A1 * 12/2004 Dry et al. ................ 266/195

* cited by examiner

*Primary Examiner*—Scott Kastler
(74) *Attorney, Agent, or Firm*—Miles & Stockbridge P.C.; Edward J. Kondracki

(57) ABSTRACT

A direct smelting plant for producing molten metal from a metalliferous feed material is disclosed. The plant includes a fixed smelting vessel to hold a molten bath of metal and slag and a gas space above the bath. The plant also includes means for supplying solids and gas feed materials to the vessel and for tapping molten material from the vessel. The plant also includes at least two platforms for supporting plant operators at different heights of the vessel. The metal tapping means and the slag tapping means are located so as to be accessible by plant operators on a cast house platform and the end metal tapping means and the end slag tapping means are located to be accessible by plant operators on an end tap platform that is at a lower height than the cast house platform.

37 Claims, 7 Drawing Sheets

DIRECT SMELTING PLANT

BACKGROUND OF THE INVENTION

1. Field of the Invention

The present invention relates to a direct smelting plant for producing molten metal from a metalliferous feed material such as ores, partly reduced ores and metal-containing waste streams.

2. Description of Related Art

A known direct smelting process, which relies principally on a molten bath as a reaction medium, and is generally referred to as the HIsmelt process, is described in International Application PCT/AU96/00197 (WO 96/31627) in the name of the applicant.

The HIsmelt process as described in the International application in the context of producing molten iron includes:
  (a) forming a bath of molten iron and slag in a vessel;
  (b) injecting into the bath:
    (i) a metalliferous feed material, typically iron oxides; and
    (ii) a solid carbonaceous material, typically coal, which acts as a reductant of the iron oxides and a source of energy; and
  (c) smelting metalliferous feed material to iron in the metal layer.

The term "smelting" is herein understood to mean thermal processing wherein chemical reactions that reduce metal oxides take place to produce molten metal.

The HIsmelt process also includes pist-combusting reaction gases, such as CO and $H_2$ released from the bath, in the space above the bath with oxygen-containing gas and transferring the heat generated by the post-combustion to the bath to contribute to the thermal energy required to smelt the metalliferous feed materials.

The HIsmelt process also includes forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous feed material and solid carbonaceous material is injected into the molten bath through a number of lances/tuyeres which are inclined to the vertical so as to extend downwardly and inwardly through the side wall of the smelting vessel and into a lower region of the vessel so as to deliver at least part of the solids material into the metal layer in the bottom of the vessel. To promote the post-combustion of reaction gases in the upper part of the vessel, a blast of hot air, which may be oxygen enriched, is injected into an upper region of the vessel through a downwardly extending hot air injection lance. Offgases resulting from the post-combustion of reaction gases in the vessel are taken away from the upper part of the vessel through an offgas duct. The vessel includes refractory-lined water cooled panels in the side wall and the roof of the vessel, and water is circulated continuously through the panels in a continuous circuit.

The HIsmelt process enables large quantities of molten metal, such as molten iron, to be produced by direct smelting in a single compact vessel. However, in order to achieve this it is necessary to transport large quantities of hot gases to and from the vessel, transport large quantities of the metalliferous feed material, such as iron-containing feed materials, to the vessel, transport large quantities of the molten metal product and slag produced in the process away from the vessel, and circulate large quantities of water through the water cooled panels—all within a relatively confined area. These functions must continue throughout a smelting operation—which extends over a long period. It is also necessary to provide access and handling facilities to enable access to the vessel and lifting of equipment between smelting operations.

U.S. Pat. No. 6,399,016 in the name of Burrow and assigned to the applicant discloses a very effective arrangement of a direct smelting plant that separates the equipment required for the various functions into distinct zones that are disposed about the vessel so as to minimise the potential for interference between the various functions and to maximise safety of the smelting operations.

Specifically, the Burrow US patent discloses a direct smelting plant that includes a fixed smelting vessel, a solid feed means, an oxygen-containing gas injection means, an oxygen-containing gas delivery duct means, an offgas duct means, a metal tapping system, and a slag tapping system. The plant is characterised by locating:
  (a) the oxygen-containing delivery duct means and the offgas duct means in a first of three discrete zones spaced circumferentially about the vessel;
  (b) the metal tapping system in a second of the three zones; and
  (c) the slag tapping system in the third of the three zones.

The disclosure in the Burrow US patent is incorporated herein by cross-reference.

The above discussion of the Burrow US patent is not to be taken as an admission that the disclosure in the patent is part of the common general knowledge.

The present invention further addresses the issue of providing a plant layout that enables the required functions of supplying large quantities of feed materials (solid and gas) to a compact vessel, removing large quantities of products of the process (metal, slag, and offgas) from the vessel, circulating large quantities of water through the water cooled panels of the vessel, permitting access to the vessel for re-lining and other maintenance purposes, and permitting access to the vessel for lifting equipment.

The present invention provides a plurality of platforms around the vessel and locates equipment for carrying out the various functions (such as metal tapping systems, slag tapping systems, access doors, etc) in relation to these platforms so that so that the equipment is accessible by plant operators on the platforms.

SUMMARY OF THE INVENTION

According to the present invention there is provided a direct smelting plant for producing molten metal from a metalliferous feed material including:
  (a) a fixed smelting vessel to hold a molten bath of metal and slag and a gas space above the bath;
  (b) a solids feed means to supply metalliferous feed material and carbonaceous material into the vessel;
  (c) a gas injection means extending downwardly into the vessel to inject an oxygen-containing gas into the gas space and/or the bath in the vessel;
  (d) a gas delivery duct means extending from a gas supply location away from the vessel to a delivery location above the vessel for delivering the oxygen-containing gas into the gas injection means;
  (e) an offgas duct means for facilitating flow of offgas from the vessel away from the vessel;

(f) a metal tapping means for tapping molten metal from the bath during a smelting operation out of the vessel and transporting the molten metal away from the vessel;

(g) an end metal tapping means for tapping molten metal from the bath at the end of the smelting operation out of the vessel and transporting the molten metal away from the vessel;

(h) a slag tapping means for tapping slag from the bath during a smelting operation out of the vessel and transporting the slag away from the vessel;

(i) an end slag tapping means for tapping molten slag from the bath at the end of the smelting operation out of the vessel and transporting the molten slag away from the vessel;

(j) at least two platforms for supporting plant operators at different heights of the vessel; and wherein the metal tapping means and the slag tapping means are located so as to be accessible by plant operators on one platform (hereinafter referred to as the "cast house platform") and the end metal tapping means and the end slag tapping means are located to be accessible by plant operators on another platform (hereinafter referred to as the "end tap platform") that is at a lower height than the cast house platform.

Preferably the vessel includes a side wall and the solids feed means includes a plurality of solids injection lances that are arranged to extend downwardly and inwardly through openings in the side wall and are removable from the vessel.

Preferably the solids injection lances are located so as to be accessible by workman on at least one other platform (hereinafter referred to as the "lance platform") that is above the cast house platform.

Preferably the solids feed means includes 4 or more even numbers of solids injection lances arranged around the vessel in pairs of diametrically opposed lances.

Preferably the solids feed means includes a main supply line for each pair of solids injection lances and a pair of branch lines that are connected at one end to the main supply line and at the other end to respective lances.

Preferably the branch lines of each pair are substantially the same length.

Preferably at least one pair of the solids injection lances is provided for injecting metalliferous feed material and at least one of the other pairs of the solids injection lances is provided for injecting carbonaceous material and optionally fluxes.

Preferably the pairs of the solids injection lances are arranged around the vessel so that adjacent lances are lances that are provided to inject different materials.

Preferably lance openings in the side wall of the vessel are located at the same height of the vessel and are spaced at equal distances around the circumference of the vessel.

Preferably the solids feed means includes a hot metalliferous feed material injection system for pre-heating at least part of the metalliferous feed material and supplying the hot metalliferous feed material to the main supply line or lines for the metalliferous feed material injection lances.

Preferably the end tap platform is above ground level.

Preferably the vessel includes at least two doors in the side wall of the vessel for allowing access to the interior of the vessel for re-lining or other maintenance work on the interior of the vessel.

Preferably the access doors include plates that are welded to the side wall. With this arrangement, when access to the interior of the vessel is required, the plates can be cut away from the side wall and replacement plates can be welded in position after the work in the interior of the vessel is completed.

Preferably the doors are spaced apart at least 90° around the circumference of the vessel. This spacing makes it possible for refractory wall demolition equipment to extend through the doors into the vessel and demolish a substantial part of the refractories of a refractory-lined side wall while the vessel is hot.

Preferably the access doors are at the same height of the vessel.

Preferably the access doors are located so as to be accessible by plant operators on the end tap platform.

Preferably the cast house platform extends above the immediate vicinity of the access doors to provide sheltered work areas in the immediate vicinity of the access doors.

Preferably the plant includes at least one overhead crane access zone that extends vertically from the end tap platform for facilitating lifting materials and/or equipment downwardly onto and upwardly from the end tap platform by means of an overhead crane.

Preferably the cast house platform is formed to define at least part of the boundary of the overhead crane access zone.

The metal tapping means and the slag tapping means may be the same unit.

The metal tapping means and the slag tapping means may also be different units with a separate metal tap hole and a separate slag tap hole located at different heights of the vessel.

In situations in which the metal tapping means and the slag tapping means are different units, preferably the metal tapping means includes a metal flow forehearth projecting outwardly from the vessel for tapping molten metal continuously from the vessel.

With this arrangement, preferably the metal tapping means includes a metal tapping launder for receiving molten metal from the forehearth.

In addition, with this arrangement, preferably the slag tapping means includes a slag tapping launder for receiving molten slag from the bath.

The end metal tapping means and the end slag tapping means may be the same unit.

The end metal tapping means and the end slag tapping means may also be different units with a separate end metal tap hole and a separate end slag tap hole located at different heights of the vessel.

In situations in which the metal tapping means is a forehearth, preferably the end metal tapping means is adapted to tap molten metal from the bath and the forehearth at the end of the smelting operation.

Preferably the plant includes a metal holding means, such as a ladle, disposed away from the vessel and the metal tapping launder extends to a location above the holding means for delivering molten metal into the holding means.

Preferably (a) the oxygen-containing gas delivery duct means, the offgas duct means, and the access doors are located in a first of three zones spaced circumferentially about the vessel and extending outwardly from the vessel; (b) the metal tapping means is located in a second of the three zones; and (c) the slag tapping means is located in the third of the three zones.

Preferably the vessel is disposed about a central upright axis and the zones radiate outwardly of the central axis outside the vessel.

Preferably the vessel is a vertical cylindrical vessel and the plurality of solids injection lances are spaced circumferentially around the vessel.

Preferably the side wall of the vessel includes water-cooled panels.

Preferably the vessel includes a roof and the roof includes water-cooled panels.

Preferably the plant includes a closed cooling water circuit for supplying water to and removing heated water from the water-cooled panels and thereafter extracting heat from the heated water and thereafter returning the water to the water-cooled panels.

Preferably the plant further includes a means for receiving slag from the slag tapping means and the end slag tapping means.

Preferably the slag receiving means includes at least one slag containment pit.

Preferably the plant includes a means for receiving metal from the end metal tapping means.

Preferably the end metal receiving means includes at least one metal containment pit for end tapping of metal.

Preferably the metal containment pit is covered to prevent direct contact between hot metal and water.

Preferably the slag and metal containment pits are at or below ground level.

Preferably the plant includes a gas heating means at the gas supply location for supplying hot gas to the gas delivery duct means for injection into the vessel.

The gas delivery duct means may include a single gas duct extending from the gas supply location to the delivery location.

Preferably the oxygen-containing gas is air or oxygen-enriched air.

BRIEF DESCRIPTION OF THE DRAWINGS

The present invention is described in more detail hereinafter with reference to the accompanying drawings, of which.

DETAILED DESCRIPTION OF THE PREFERRED EMBODIMENT

The direct smelting plant shown in the Figures includes a direct smelting vessel that is suitable particularly for operation by the HIsmelt process as described in International patent application PCT/AU96/00197. The following description is in the context of smelting iron ore fines to produce molten iron in accordance with the HIsmelt process.

Figure 1:
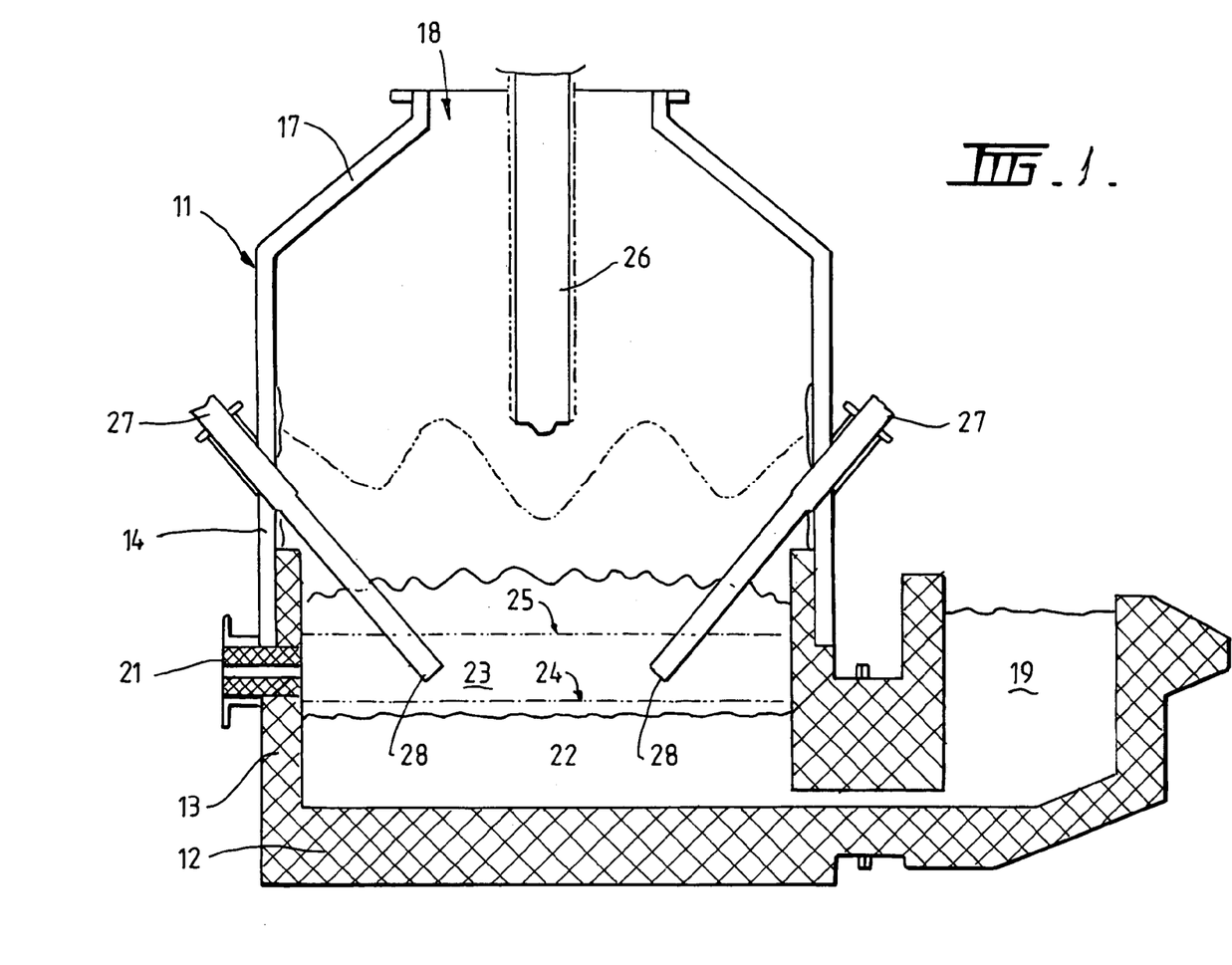
FIG. 1 is a vertical cross-section through a direct smelting vessel that forms part of one embodiment of a direct smelting plant in accordance with the present invention.

With reference initially to FIG. 1, the metallurgical vessel is denoted generally as 11 and has a hearth that incudes a base 12 and sides 13 formed from refractory bricks, side walls 14 which form a generally cylindrical barrel extending upwardly from the sides 13 of the hearth and which include an upper barrel section and a lower barrel section supporting water-cooled panels (not shown), a roof 17 supporting water-cooled panels (not shown), an outlet 18 for offgases, a forehearth 19 for discharging molten metal continuously, and a tap-hole 21 for discharging molten slag during smelting.

In use of the vessel to smelt iron ore fines to produce molten iron in accordance with the HIsmelt process, the vessel 11 contains a molten bath of iron and slag which includes a layer 22 of molten metal and a layer 23 of molten slag on the metal layer 22. The arrow marked by the numeral 24 indicates the position of the nominal quiescent surface of the metal layer 22 and the arrow marked by the numeral 25 indicates the position of the nominal quiescent surface of the slag layer 23. The term "quiescent surface" is understood to mean the surface when there is no injection of gas and solids into the vessel.

Figures 2, 2A:
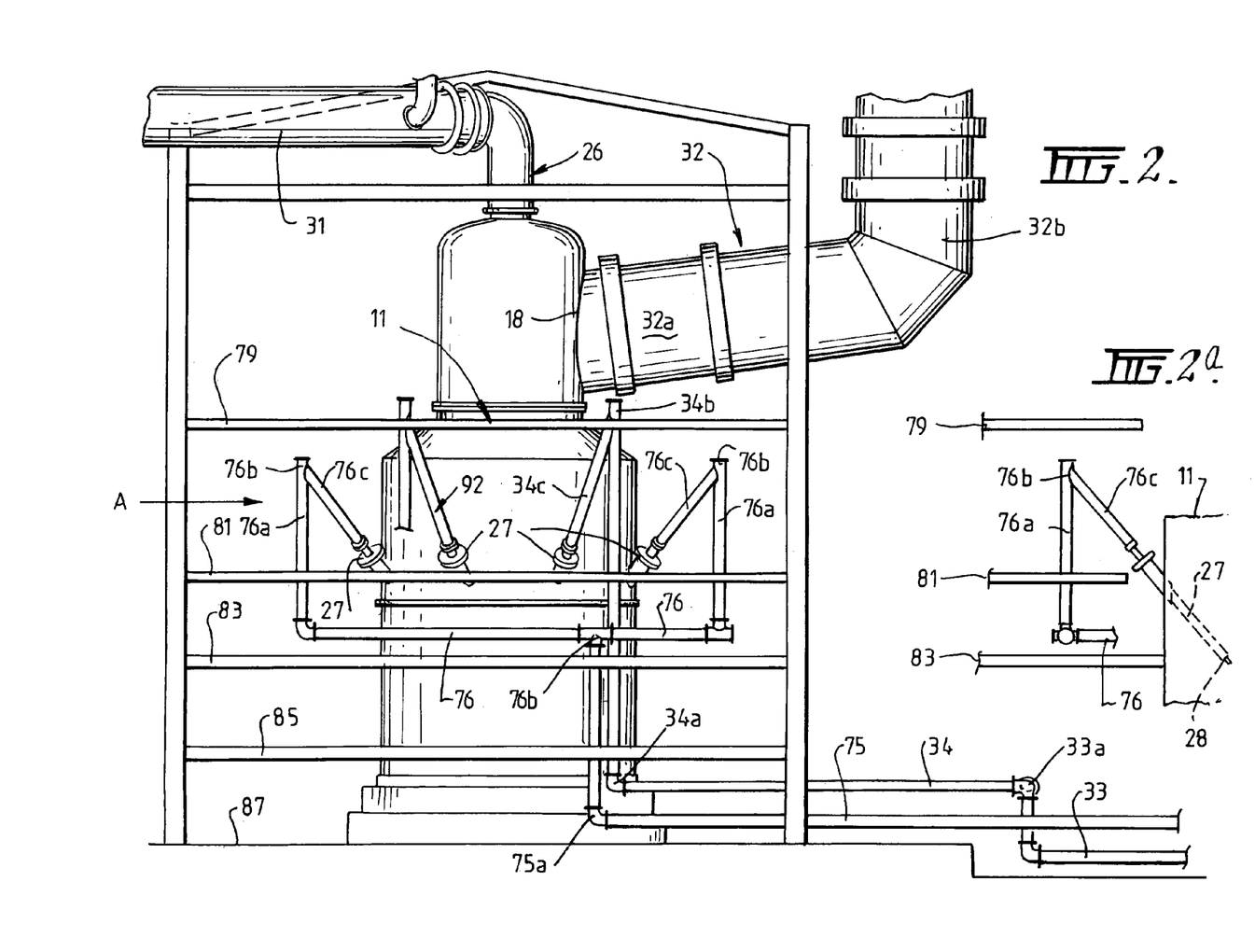
FIG. 2 is a side elevation of the vessel and the arrangement of platforms around the vessel and the equipment on the platforms that form a major part of the embodiment of the direct smelting plant.
FIG. 2a is an enlarged side elevation of the solids injection lance and hot ore supply lines indicated by the arrow "A" in FIG. 2.
Figure 3:
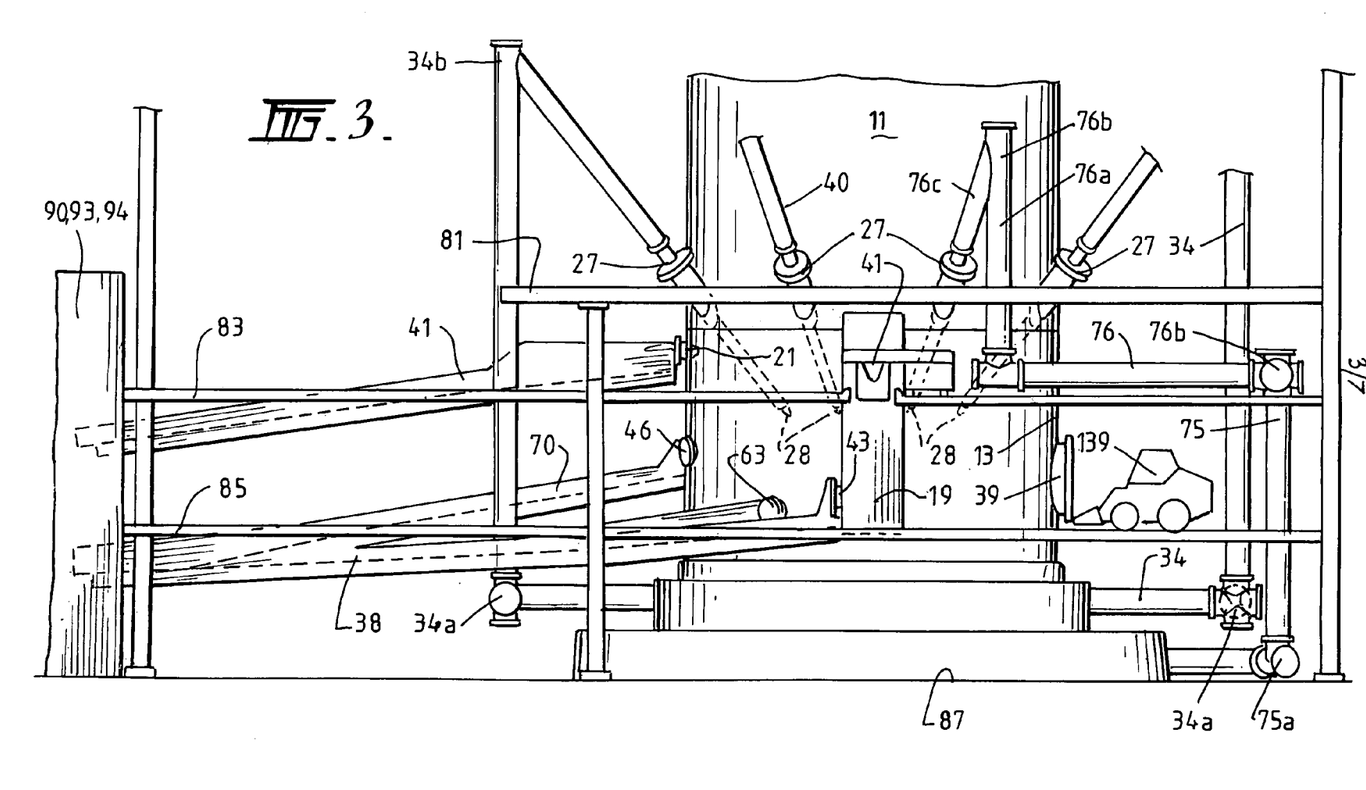
FIG. 3 is a side elevation of a lower part of the vessel and the arrangement of platforms around the vessel and the equipment on the platforms that form a major part of the embodiment of the direct smelting plant viewed from a location that is 90° from the location from which the vessel is viewed from in FIG. 2.

As can best be seen in FIGS. 2 and 3, the vessel includes a series of platforms 79, 81, 83, 85 at different heights of the vessel above ground level 87. The platforms enable installation and operation of vessel and other plant equipment described hereinafter around the compact vessel 11 in a way which separates the various operational functions of the equipment so as to minimise interference between the various operations and, accordingly, maximising operational safety. The heights of the platforms 79, 81, 83, 85 are selected to enable workman on the platforms to have convenient access to the plant equipment. In addition, the "footprints" of the platforms 79, 81, 83, 85 are selected to permit overhead crane access to selected areas of lower platforms and to provide overhead protection for work areas of the lower platforms.

As is discussed in further detail hereinafter, the platforms 79, 81 are solids injection lance platforms, the platform 83 is a cast house platform, and the platform 85 is an end tap platform.

Figure 5:
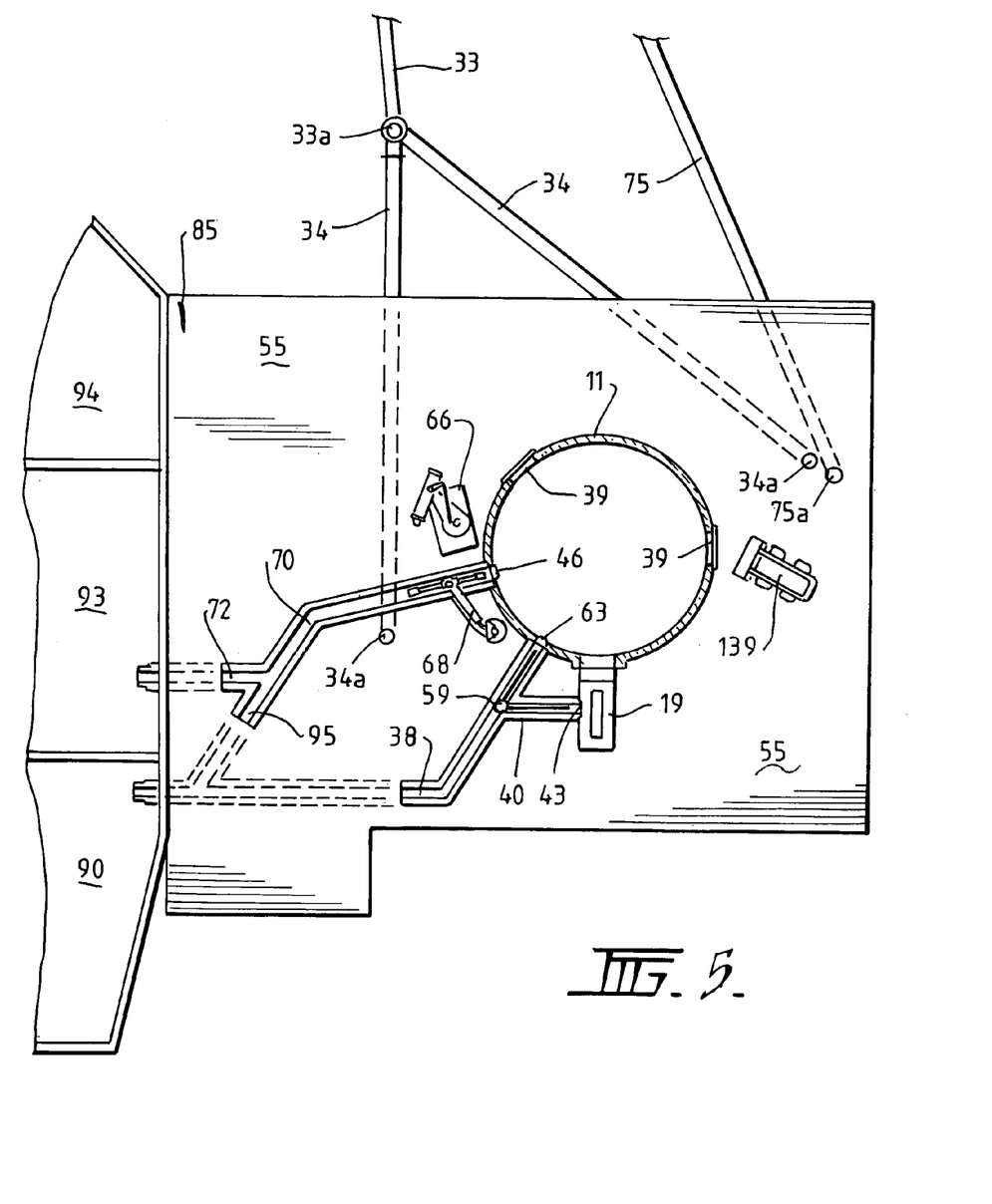
FIG. 5 illustrates the layout of the end tap platform of the embodiment of the direct smelting plant.

As can best be seen in FIG. 5, the vessel 11 includes 2 access doors 39 in the sides 13 of the hearth for allowing access to the interior of the vessel 11 for re-lining or other maintenance work in the interior of the vessel. The access doors 39 are in the form of steel plates that are welded to the sides 13. When access to the interior of the vessel is required, the plates are cut away from the side walls and replacement plates are welded in position after the work in the vessel has been completed. The access doors 39 are at the same height of the vessel 11. The access doors 39 are spaced at least 90° apart around the circumference of the vessel. This spacing makes it possible for refractory wall demolition equipment to extend through the doors into the vessel and demolish a substantial part of the refractories of a refractory-lined side wall while the vessel is hot. The access doors 39 are sufficiently large to allow bob-cat 139 or similar equipment access to the interior of the vessel.

Figure 6:
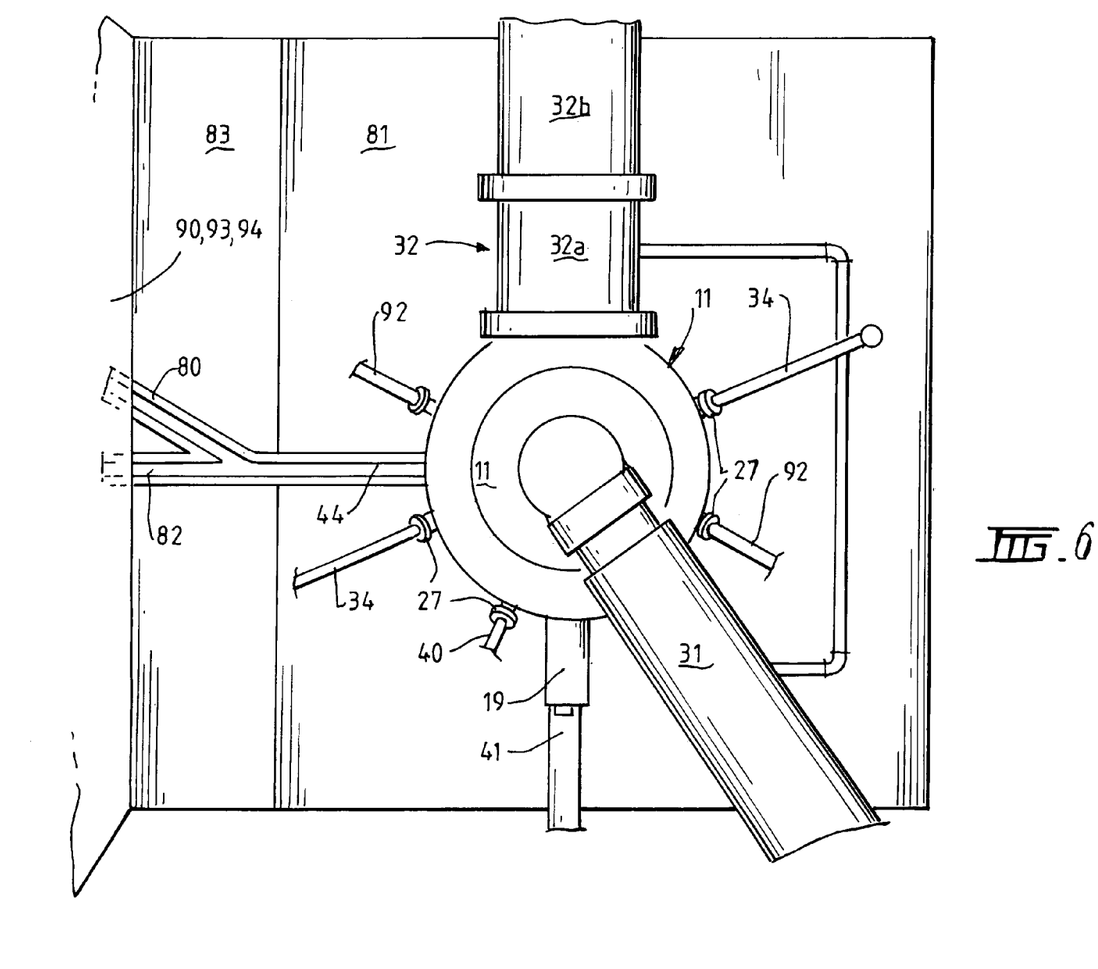
FIG. 6 is a computer-generated top plan view of the embodiment of the direct smelting plant which illustrates the cast house platform and equipment on that platform and a section through the vessel at that height of the vessel and equipment above that platform and with equipment above that platform removed to clarify the view of the plant.

As can best be seen in FIG. 1, the vessel 11 is fitted with a gas injection lance 26 for delivering a hot air blast into an upper region of the vessel. The lance 26 extends downwardly through the roof 17 of the vessel 11 into the upper region of the vessel. In use, the lance 26 receives an oxygen-enriched hot air flow through a hot gas delivery duct 31 (FIGS. 2 and 6) which extends from a hot gas supply station (not shown) located some distance away from the reduction vessel 11. The hot gas supply station includes a series of hot gas stoves (not shown) and an oxygen plant (not shown) to enable an oxygen enriched air stream to be passed through the hot gas stoves and into the hot gas delivery duct 31 which extends to a connection with the gas injection lance 26 at a location above the vessel 11. Alternatively oxygen may be added to the air stream after the air stream has been heated by the stoves.

With reference to the Figures generally, the vessel 11 is also fitted with 8 solids injection lances 27 extending downwardly and inwardly through openings (not shown) in the side walls 14 of the vessel and into the slag layer 23 for injecting iron ore fines, solid carbonaceous material, and fluxes entrained in an oxygen-deficient carrier gas into the metal layer 22.

The lance openings in the side walls 14 of the vessel are located at the same height of the vessel 11 and are spaced at equal distances around the circumference of the vessel. The lances 27 are formed and are located in the lance openings so that their outlet ends 28 are above the surface of the metal layer 22 during operation of the process. This position of the lances 27 reduces the risk of damage through contact with molten metal and also makes it possible to cool the lances by forced internal water cooling without significant risk of water coming into contact with the molten metal in the vessel.

The lances 27 are in 2 groups of 4 lances, with the lances 27 in one group receiving hot iron ore fines supplied via a hot ore injection system and the lances 27 in the other group receiving coal and flux via a carbonaceous material/flux injection system during a smelting operation. The lances 27 in the 2 groups are arranged alternately around the circumference of the vessel.

Figure 7:
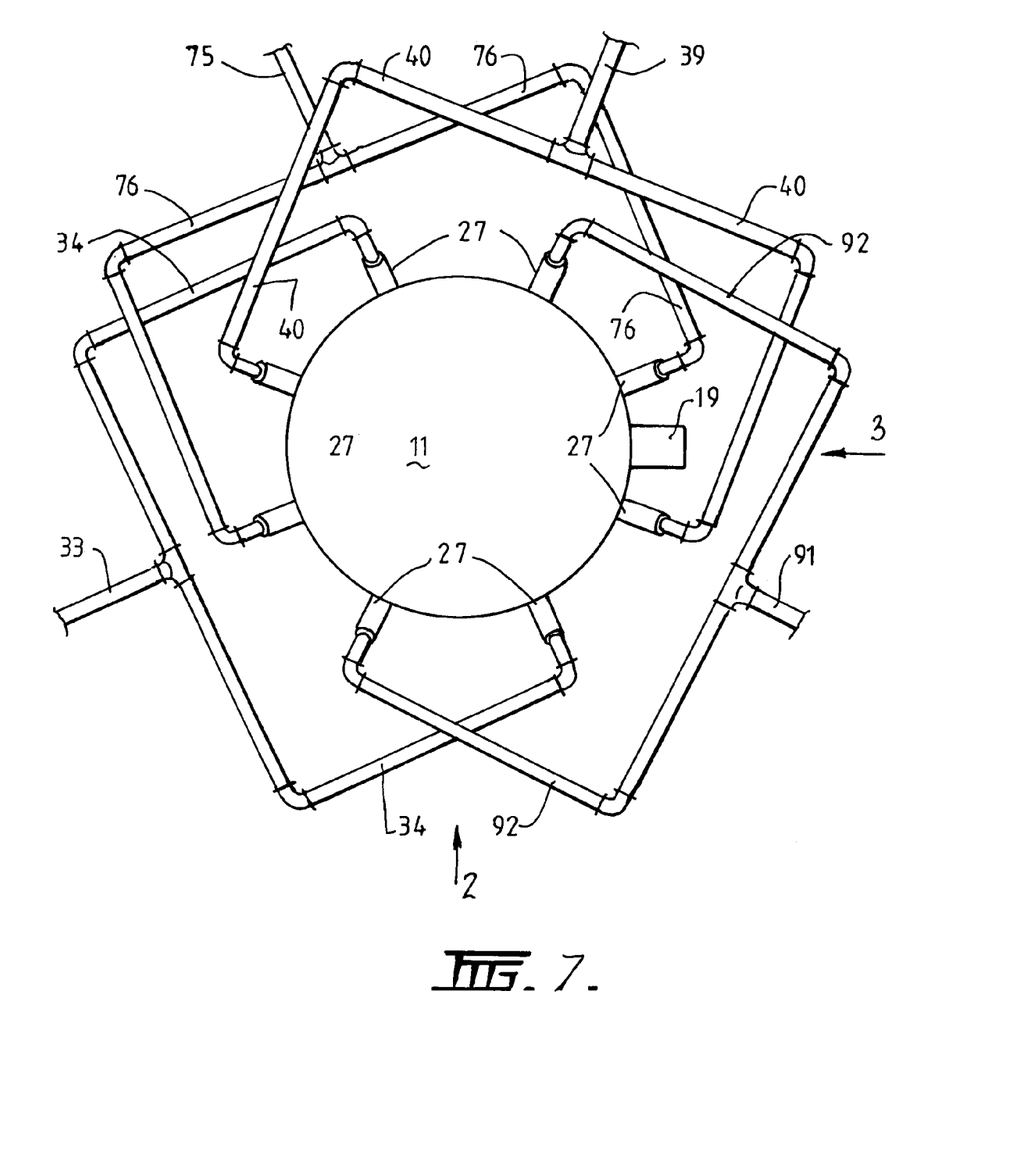
FIG. 7 is a diagrammatic plan of the arrangement of solids injection lances around the vessel the supply lines for the lances.

The hot ore injection system includes a pre-heater (not shown) for heating the iron ore fines and a hot ore transfer system that includes a series of supply lines and a supply of carrier gas for transporting the hot ore fines in the supply lines and injecting the hot ore fines at a temperature of the order of 680° C. into the vessel. The general arrangement of the lances 27 and the supply lines immediately upstream of the lances 27 is shown diagrammatically in FIG. 7.

With reference to the Figures generally, the hot ore injection system includes a main hot ore supply line 75 (FIGS. 2 to 5) and 2 branch lines 76 (FIGS. 2 to 4) that are connected to diametrically opposed lances 27 and are arranged to supply hot ore to these lances 27 during a smelting operation. The hot ore injection system also includes another main hot ore supply line 33 (FIGS. 2 and 5) and 2 branch lines 34 (FIGS. 2 to 5) that are connected to the other pair of diametrically opposed lances 27 and are arranged to supply hot ore to these lances 27.

Figure 4:
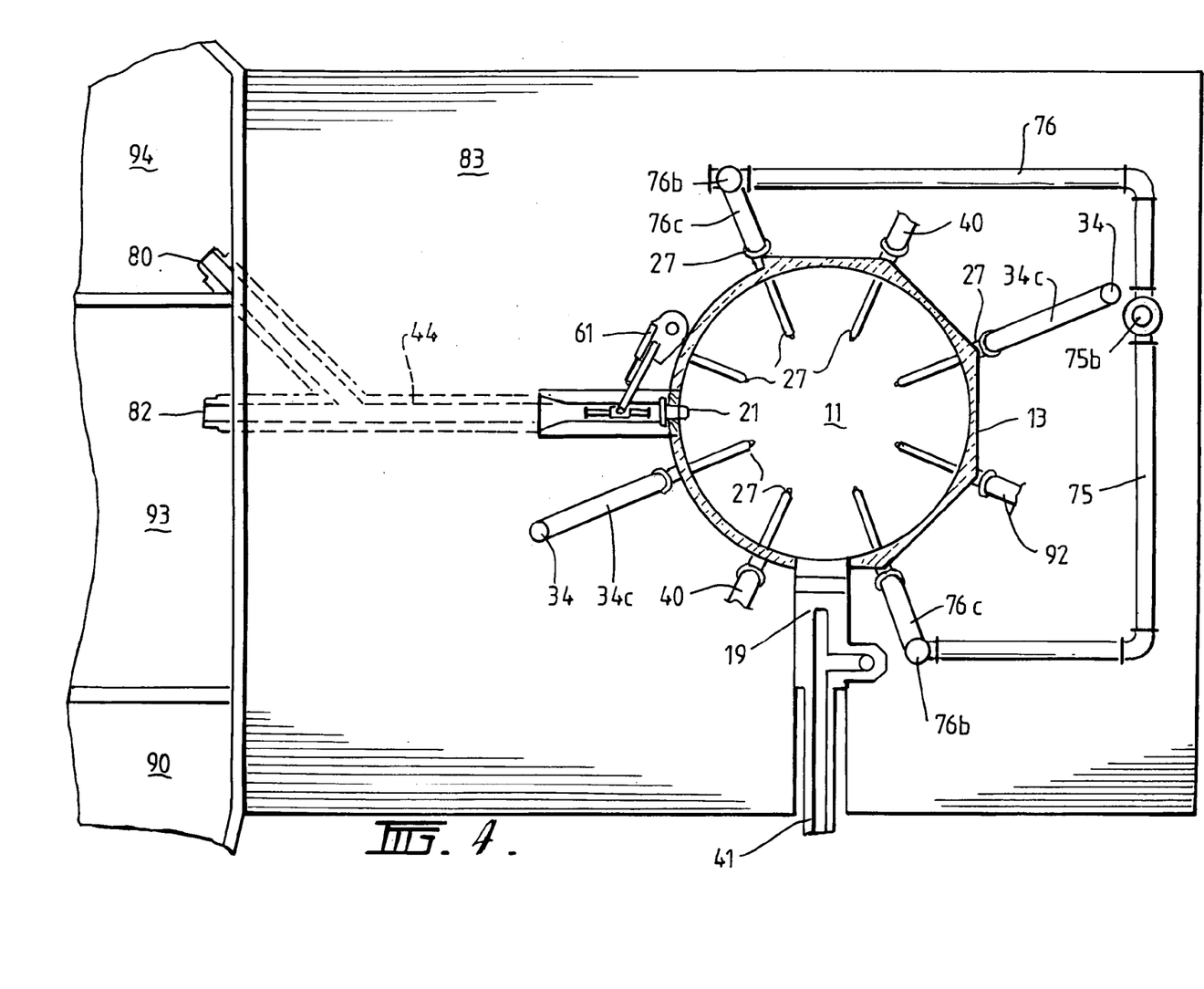
FIG. 4 illustrates the layout of the cast house platform of the embodiment of the direct smelting plant.

As can be seen in FIGS. 2 to 5, the main supply line 75 runs on or close to ground level from a remote location (not shown) away from the vessel and under the end tap platform 85 to a location 75a in FIGS. 2 and 3 and then vertically upwardly from this location through or adjacent the end tap platform 85 and the cast house platform 83 to a location 75b in FIGS. 2 to 4 above the cast house platform 83. The branch lines 76 initially extend horizontally in opposite directions from the main line 75 at the location 75b and then vertically upwardly at locations 76a (FIGS. 2 and 3) to locations 76b (FIGS. 2 to 4) and then inwardly and downwardly in short straight sections 76c to the inlets of lances 27.

As can also be seen in FIGS. 2 and 3, the main supply line 33 runs on or close to ground level from a remote location (not shown) away from the vessel to a location 33a in FIG. 5 and the line branches into the branch lines 34 at this location. These branch lines define a V-shape. The branch lines 34 extend on or close to ground level under the end tap platform 85 to locations 34a (FIGS. 2 and 3) and then vertically upwardly from these locations through or adjacent the end tap platform 85 and the cast house platform 83 to the locations 34b (FIG. 2) and then inwardly and downwardly in short straight sections 34c (FIG. 2, only one shown) to the inlets of lances 27.

The above-described arrangement of the pairs of main and branch lines avoids interference between the lines in the confined space around the vessel.

The carbonaceous material/flux injection system includes similar main supply lines 39, 91 and branch supply lines 40, 92, respectively for diametrically opposed pairs of the lances 27.

The lances 27 are arranged to be removable from the vessel 11.

The offgas outlet 18 of the vessel 11 is connected to an offgas duct 32 (shown in FIGS. 2, 6 and 7) which transports the offgas away from the vessel 11 to a treatment station (not shown) where it is cleaned and passed through heat exchangers for preheating the materials fed to the vessel 11. The HIsmelt process preferably operates with air or oxygen-enriched air and therefore generates substantial volumes of offgas and requires a relatively large diameter offgas duct 32. As can best be seen in FIG. 2, the offgas duct includes a gently inclined first section 32a extending from the offgas outlet 18 of the vessel 11 and a vertically extending second section 32b that extends from the first section 32a.

The hot gas delivery duct 31 and the offgas duct 32 extend away from the upper part of the vessel 11 to remote locations (not shown) and therefore occupy space in that region of the vessel and therefore have an impact on the positioning of plant equipment such as overhead cranes or other mobile handling equipment that is required for maintenance of the vessel and a cooling water circuit for the water-cooled panels in the side walls 14 and the roof 17 of the vessel 11.

As is indicated above, the side walls 14 and the roof 17 of the vessel 11 support water-cooled panels (not shown) and the plant includes a cooling water circuit. The cooling water circuit supplies water to and removes heated water from the water-cooled panels and thereafter extracts heat from the heated water before returning the water to the water-cooled panels.

In a smelting operation in accordance with the HIsmelt process, ore fines and a suitable carrier gas and coal and a suitable carrier gas are injected into the molten bath through the lances 27. The momentum of the solid materials and the carrier gases causes the solid materials to penetrate the metal layer 15. The coal is devolatilised and thereby produces gas in the metal layer 15. Carbon partially dissolves in the metal and partially remains as solid carbon. The ore fines are smelted to metal and the smelting reaction generates carbon monoxide. The gases transported into the metal layer and generated by devolatilisation and smelting reactions produce significant buoyancy uplift of molten metal, solid carbon and slag (drawn into the metal layer as a consequence of solid/gas/injection) from the metal layer 15 which generates upward movement of splashes, droplets and streams of molten metal and slag, and these splashes, droplets and streams entrain slag as they move through the slag layer. The buoyancy uplift of molten metal, solid carbon and slag causes substantial agitation of the slag layer 16, with the result that the slag layer expands in volume. In addition, the upward movement of splashes, droplets and streams of molten metal and slag—caused by buoyancy uplift of molten metal, solid carbon and slag—extend into the space above the molten bath and forms a transition zone. Injection of the oxygen-containing gas via the lance 26 post-combusts reaction gases, such as carbon monoxide and hydrogen, in the upper part of the vessel. Offgases resulting from the post-combustion of reaction gases in the vessel are taken away from the upper part of the vessel through the offgas duct 32.

Hot metal produced during a smelting operation is discharged from the vessel 11 through a metal tapping system that includes the forehearth 19 and a hot metal launder 41 connected to the forehearth. The outlet end of the hot metal launder 41 is positioned above a hot metal ladle station (not shown) so as to supply molten metal downwardly to ladles located at the station.

The plant includes an end metal tapping system for tapping molten metal from the vessel 11 at the end of a smelting operation out of the lower part of the vessel and transporting that molten metal away from the vessel 11. The end metal tapping system includes a metal end tap hole 63 in the vessel and a launder 38 for transferring molten metal discharged from the vessel 11 via the tap hole to a containment metal pit 91 at ground level. Ideally this pit 91 is covered (not shown) from the elements to prevent direct contact between hot metal in the pit and water. The end metal tapping system also includes a metal tap hole 43 in the forehearth 19 and a launder 40 for transferring molten metal discharged from the forehearth 19 via the tap hole to the main hot metal launder 38. An end tap drill 59 is also provided to open the tap holes 63, 43 to release metal from the vessel and the forehearth.

The plant includes a slag tapping system for tapping molten slag from the vessel 11 periodically from the lower part of the vessel and transporting that slag away from the vessel 11 during a smelting operation. The slag tapping system includes a slag notch 21 in the vessel 11 and a launder 44 with 2 end branches 80, 82 for transferring molten slag discharged from the vessel 11 via the slag notch 21 downwardly from the height of the cast house platform 83 into separate slag containment pits 93, 95 at ground level 87. Two pits are provided so that one pit can be out of service and allowed to cool down prior to the slag being removed while the other pit is in service and receiving molten slag. A slag notch plug and pricker machine 61 is provided to open and seal the slag notch 21 to release slag from the vessel 11.

The plant includes a slag tapping system for draining slag from the vessel 11 at the end of a smelting operation. The slag end tapping system includes a slag tap hole 46 in the vessel 11 and a main launder 70 and a branch launder 72 for transferring molten material discharged from the vessel 11 via the slag tap hole 46 to the containment pit 93. A branch launder 95 connects the slag launder 70 to the hot metal launder 38. The branch launder 95 is used to transfer molten metal that usually flows from the vessel when the tap hole 46 is first opened to the metal containment pit 91. Prior to an end tap, the branch launder 72 is blocked so that molten material can only flow to the metal containment pit 91 via the branch launder 95. Towards the end of the metal flow, the branch launder 95 is blocked and the branch launder 72 is unblocked so that flow of molten material is diverted to the slag pit 93. A slag drain drill 68 is provided for opening the tap hole 46 to release slag from the vessel. A mud gun 66 is provided to close an open tap hole 46.

As is indicated above, the vessel includes a series of platforms 79, 81, 83, 85 at different heights of the vessel above ground level 87. The platforms enable installation and operation of vessel and other plant equipment.

The lowest platform, the end tap platform 85, is positioned in relation to the vessel 11 at a height that is selected so that workman on the platform can have convenient access to the end metal tapping system (metal end tap hole 63, launder 38, metal tap hole 43, launder 40, and end tap drill 59), the slag end tapping system (slag tap hole 46, launder 70, branch launder 95, slag drain drill 68, mud gun 66), and the access doors 39. Equipment such as the metal end tap drill, slag drain drill 68, and mud gun 66 are mounted directly on the platform. The platform also includes 2 overhead crane access areas 55 that are essentially clear spaces on and from which equipment and materials can be lifted, for example to facilitate re-lining the interior of the vessel 11.

The next highest platform, the cast house platform 83, is positioned in relation to the vessel 11 at a height that is selected so that workman on the platform can have convenient access to the metal tapping system (forehearth 19 and hot metal launder 41) and the slag tapping system (slag notch 21, launder 44, and slag notch plug and pricker machine 61). The footprint of the platform 83 is selectively formed so that the platform does not extend into the space above the overhead access areas 55 of the end tap platform 85 so that there is clear overhead crane access to these areas 55. The footprint of the platform 83 is also selectively formed so that the platform extends above the work areas in the immediate vicinity of the end metal and slag tapping systems and the access doors 39 on the end tap platform 85 to provide overhead protection for workman in these areas.

The next highest platforms, the lance platforms 79, 81, are positioned in relation to the vessel 11 at heights that are selected so that workman on the platforms can have convenient access to the lances 27.

The footprint of the platform 81 is shown in FIG. 3. The footprint of the platform 81 is selectively formed so that the platform does not extend into the space above the overhead access areas 55 of the end tap platform 85 so that there is clear overhead crane access to these areas 55. The footprint is also selectively formed so that the platform extends above the work areas in the immediate vicinity of the metal and slag tapping systems to provide overhead protection for workman working in these areas.

In addition to the above-described plant equipment being arranged on a series of platforms 79, 81, 83, 85, the equipment is also arranged on the platforms within a series of circumferentially and vertically extending zones that further enable installation and operation of all the above-described equipment around the compact vessel 11 in a way which separates the various operational functions of the equipment so as to minimise interference between the various operations and, accordingly, maximising operational safety.

Specifically, the layout of the installation is divided into the following 3 functional zones that extend vertically and are spaced circumferentially around the vessel 11 and radiate outwardly of the central upright axis of the vessel.

Zone 1: General Access and Services

This zone, which extends approximately 180° around the circumference of the vessel 11 contains:—

The footprints of the overhead hot gas delivery duct 31 and the offgas duct 32.

The access doors 39 in the vessel 11.

Zone 2: Metal Tapping

This zone contains:—

The metal tapping system (forehearth 19 and hot metal launder 41).

The end metal tapping system (metal end tap hole 63, launder 38, metal tap hole 43, launder 40, and end tap drill).

Zone 3: Slag Tapping

This zone contains:—

The slag tapping system (slag notch 21, launder 44, and slag notch plug and pricker machine 61).

The slag end tapping system (slag tap hole 46, launder 70, branch launder 95, slag drain drill 68, and mud gun 66).

The plant also includes the zones, ie the space, above the above-described overhead crane access areas 55 that enable materials and equipment to be lifted onto and removed from the end tap platform. The overhead access is particularly important for efficient lifting of materials and equipment required for re-lining or other maintenance work on the interior of the vessel.

Many modifications may be made to the embodiment of the present invention described above without departing from the spirit and scope of the invention.

What is claimed is:

1. A direct smelting plant for producing molten metal from a metalliferous feed material including:
    (a) a fixed smelting vessel to hold a molten bath of metal and slag and a gas space above the bath, the smelting vessel having a side wall;
    (b) a solids feed apparatus to supply metalliferous feed material and carbonaceous material into the vessel, the solids feed apparatus including a plurality of solids injection lances that are arranged to extend downwardly and inwardly through openings in the side wall and are removable from the vessel;
    (c) a gas injection apparatus extending downwardly into the vessel to inject an oxygen-containing gas into the gas space and/or the bath in the vessel;
    (d) a gas delivery duct apparatus extending from a gas supply location away from the vessel to a delivery location above the vessel for delivering the oxygen-containing gas into the gas injection apparatus;
    (e) an offgas duct apparatus for facilitating flow of offgas from the vessel away from the vessel;
    (f) a metal tapping apparatus for tapping molten metal from the bath during a smelting operation out of the vessel and transporting the molten metal away from the vessel;
    (g) an end metal tapping apparatus for tapping molten metal from the bath at the end of the smelting operation out of the vessel and transporting the molten metal away from the vessel; and
    (h) slag tapping apparatus for tapping slag from the bath during a smelting operation out of the vessel and transporting the slag away from the vessel;
    (i) end slag tapping apparatus for tapping molten slag from the bath at the end of the smelting operation out of the vessel and transporting the molten slag away from the vessel;
    (j) at least three platforms for supporting plant operators at different heights of the vessel with
        (i) the metal tapping means and the slag tapping means being located so as to be accessible by plant operators on a cast house platform;
        (ii) the end metal tapping means and the end slag tapping means being located to be accessible by plant operators on a separate end tap platform that is at a lower height than the cast house platform and above ground level;
        (iii) the solids injection lances being located so as to be accessible by plant operators on a lance platform that is separate and above the cast house platform; and
        (iv) at least a portion of the solids feed apparatus extending under the end tap platform from a location remote from the vessel.

2. The plant defined in claim 1 wherein the solids feed apparatus includes four or more even numbers of solids injection lances arranged around the vessel in pairs of diametrically opposed lances.

3. The plant defined in claim 2 wherein the solids feed apparatus includes a main supply line for each pair of solids injection lances and a pair of branch lines that are connected at one end to the main supply line and at the other end to respective lances and wherein at least a portion of a main supply line or a branch line extends under the end tap platform.

4. The plant defined in claim 3 wherein the branch lines of each pair are substantially the same length.

5. The plant defined in claim 2 wherein at least one pair of the solids injection lances is provided for injecting metalliferous feed material and at least one of the other pairs of the solids injection lances is provided for injecting carbonaceous material and optionally fluxes.

6. The plant defined in claim 2 wherein the pairs of the solids injection lances are arranged around the vessel so that adjacent lances are lances that are provided to inject different materials.

7. The plant defined in claim 1 wherein lance openings in the side wall of the vessel are located at the same height of the vessel and are spaced at equal distances around the circumference of the vessel.

8. The plant defined in claim 5 wherein the solids feed apparatus includes a hot metalliferous feed material injection system for pre-heating at least part of the metalliferous feed material and supplying the hot metalliferous feed material to the main supply line or lines for the metalliferous feed material injection lances.

9. The plant defined in claim 1 wherein the vessel includes at least two doors in the side wall of the vessel for allowing access to the interior of the vessel for re-lining or other maintenance work on the interior of the vessel.

10. The plant defined in claim 9 wherein the access doors include plates that are welded to the side wall.

11. The plant defined in claim 9 wherein the access doors are spaced apart at least 90° around the circumference of the vessel.

12. The plant defined in claim 9 wherein the access doors are at the same height of the vessel.

13. The plant defined in claim 9 wherein the access doors are located so as to be accessible by plant operators on the end tap platform.

14. The plant defined in claim 9 wherein the cast house platform extends above the immediate vicinity of the access doors to provide sheltered work areas in the immediate vicinity of the access doors.

15. The plant defined in claim 1 includes at least one overhead crane access zone that extends vertically from the end tap platform for facilitating lifting materials and/or equipment downwardly onto and upwardly from the end tap platform by means of an overhead crane.

16. The plant defined in claim 15 wherein the cast house platform is formed to define at least part of the boundary of the overhead crane access zone.

17. The plant defined in claim 1 wherein the metal tapping apparatus and the slag tapping apparatus are different units with a separate metal tap hole and a separate slag tap hole located at different heights of the vessel.

18. The plant defined in claim 17 wherein the metal tapping apparatus includes a metal flow forehearth projecting outwardly from the vessel for tapping molten metal continuously from the vessel.

19. The plant defined in claim 18 wherein the metal tapping apparatus includes a metal tapping launder for receiving molten metal from the forehearth.

20. The plant defined in claim 17 wherein the slag tapping apparatus includes a slag tapping launder for receiving molten slag from the bath.

21. The plant defined in claim 1 wherein the end metal tapping apparatus and the end slag tapping apparatus are different units with a separate end metal tap hole and a separate end slag tap hole located at different heights of the vessel.

22. The plant defined in claim 21 wherein the end metal tapping apparatus is adapted to tap molten metal from the bath and the forehearth at the end of the smelting operation.

23. The plant defined in claim 9 wherein (a) the oxygen-containing gas delivery duct apparatus, the offgas duct apparatus, and the access doors are located in a first of three zones spaced circumferentially about the vessel and extending outwardly from the vessel; (b) the metal tapping apparatus is located in a second of the three zones; and (c) the slag tapping apparatus is located in the third of the three zones.

24. The plant defined in claim 23 wherein the vessel is disposed about a central upright axis and the zones radiate outwardly of the central axis outside the vessel.

25. The plant defined in claim 1 wherein the side wall of the vessel includes water-cooled panels.

26. The plant defined in claim 25 includes a closed cooling water circuit for supplying water to and removing heated water from the water-cooled panels and thereafter extracting heat from the heated water and thereafter returning the water to the water-cooled panels.

27. A direct smelting plant for producing molten metal from a metalliferous feed material including:
   (a) a fixed smelting vessel to hold a molten bath of metal and slag and a gas space above the bath, the smelting vessel having a side wall;
   (b) a solids feed apparatus to supply metalliferous feed material and carbonaceous material into the vessel, the solids feed apparatus including a plurality of solids injection lances that are arranged to extend downwardly and inwardly through openings in the side wall and are removable from the vessel;
   (c) a gas injection apparatus extending downwardly into the vessel to inject an oxygen-containing gas into the gas space and/or the bath in the vessel;
   (d) a gas delivery duct apparatus extending from a gas supply location away from the vessel to a delivery location above the vessel for delivering the oxygen-containing gas into the gas injection apparatus;
   (e) an offgas duct apparatus for facilitating flow of offgas from the vessel away from the vessel;
   (f) a metal tapping apparatus for tapping molten metal from the bath during a smelting operation out of the vessel and transporting the molten metal away from the vessel;
   (g) an end metal tapping apparatus for tapping molten metal from the bath at the end of the smelting operation out of the vessel and transporting the molten metal away from the vessel;
   (h) a slag tapping apparatus for tapping slag from the bath during a smelting operation out of the vessel and transporting the slag away from the vessel;
   (i) an end slag tapping apparatus for tapping molten slag from the bath at the end of the smelting operation out of the vessel and transporting the molten slag away from the vessel; and
   (j) at least two platforms for supporting plant operators at different heights of the vessel with
      (i) the end metal tapping apparatus and the end slag tapping apparatus being located to be accessible by plant operators on an end tap platform; and
      (ii) the metal tapping apparatus and the slag tapping apparatus being located so as to be accessible by plant operators on a cast house platform that is separate and above the end tap platform and the cast house platform being selectively formed so as to have a footprint that extends above the work areas at least in the immediate vicinity of the end metal tapping apparatus and the end slag tapping apparatus.

28. A direct smelting plant as claimed in claim 27 wherein said slag tapping apparatus is located on said vessel substantially in the vicinity of the end slag tapping apparatus and wherein said cast house platform is located intermediate said slag tapping apparatus and said end slag tapping apparatus.

29. A direct smelting plant as claimed in claim 28 wherein said end metal tapping apparatus is located on said vessel substantially in the vicinity of the metal tapping apparatus and wherein said cast house platform is located intermediate said end metal tapping apparatus and at least a portion of said metal tapping apparatus.

30. A direct smelting plant as claimed in claim 27 wherein said end metal tapping apparatus is located on said vessel substantially in the vicinity of the metal tapping apparatus and wherein said cast house platform is located intermediate said end metal tapping apparatus and at least a portion of said metal tapping apparatus.

31. A direct smelting plant for producing molten metal from a metalliferous feed material including:
   (a) a fixed smelting vessel to hold a molten bath of metal and slag and a gas space above the bath, the smelting vessel having a side wall;
   (b) a solids feed apparatus to supply metalliferous feed material and carbonaceous material into the vessel, the solids feed apparatus including a plurality of solids injection lances that are arranged to extend downwardly and inwardly through openings in the side wall and are removable from the vessel;
   (c) a gas injection apparatus extending downwardly into the vessel to inject an oxygen-containing gas into the gas space and/or the bath in the vessel;
   (d) a gas delivery duct apparatus extending from a gas supply location away from the vessel to a delivery location above the vessel for delivering the oxygen-containing gas into the gas injection apparatus;
   (e) an offgas duct apparatus for facilitating flow of offgas from the vessel away from the vessel;

(f) a metal tapping apparatus for tapping molten metal from the bath during a smelting operation out of the vessel and transporting the molten metal away from the vessel;

(g) an end metal tapping apparatus for tapping molten metal from the bath at the end of the smelting operation out of the vessel and transporting the molten metal away from the vessel;

(h) a slag tapping apparatus for tapping slag from the bath during a smelting operation out of the vessel and transporting the slag away from the vessel;

(i) an end slag tapping apparatus for tapping molten slag from the bath at the end of the smelting operation out of the vessel and transporting the molten slag away from the vessel; and (j) at least two platforms for supporting plant operators at different heights of the vessel with
  (i) the metal tapping apparatus and the slag tapping apparatus being located so as to be accessible by plant operators on a cast house platform;
  (ii) the end metal tapping apparatus and the end slag tapping apparatus being located to be accessible by plant operators on an end tap platform that is at a lower height than the cast house platform; and
  (iii) the cast house platform being selectively formed with a footprint that does not extend into a region of space above a portion of the end tap platform to thereby provide overhead crane access to said portion of the end tap platform whereby equipment and materials can be lifted from said portion of the end tap platform.

32. The direct smelting plant as claimed in claim 31 wherein the end tap platform is located above ground level and at least a portion of the solids feed apparatus extends under the end tap platform from a location remote from the vessel.

33. The direct smelting plant as claimed in claim 32 wherein the slag tapping apparatus is located on said vessel substantially in the vicinity of the end slag tapping apparatus and wherein said cast house platform is located intermediate said slag tapping apparatus and said end slag tapping apparatus.

34. The direct smelting plant as claimed in claim 33 wherein said end metal tapping apparatus is located on said vessel substantially in the vicinity of the metal tapping apparatus and wherein said cast house platform is located intermediate said end metal tapping apparatus and at least a portion of said metal tapping apparatus.

35. The direct smelting plant as claimed in claim 31 wherein the slag tapping apparatus is located on said vessel substantially in the vicinity of the end slag tapping apparatus and wherein said cast house platform is located intermediate said slag tapping apparatus and said end slag tapping apparatus.

36. The direct smelting plant as claimed in claim 31 wherein the solids feed apparatus includes solids feed supply lines extending from a location remote from said vessel and having a portion extending under the end tap platform and connecting at one end with said solids injection lances.

37. The direct smelting plant as claimed in claim 36 wherein said supply line includes a main supply line connected at one end with a pair of branch lines, said branch lines connecting with said solids injection lances.

* * * * *